United States Patent

Wolfe

[15] 3,640,602
[45] Feb. 8, 1972

[54] PROJECTION SCREEN

[72] Inventor: Robert N. Wolfe, Rochester, N.Y.
[73] Assignee: Eastman Kodak Company, Rochester, N.Y.
[22] Filed: Apr. 7, 1969
[21] Appl. No.: 814,006

[52] U.S. Cl. .................................................350/120
[51] Int. Cl. ......................................................G03b 21/56
[58] Field of Search .................................350/120, 123, 117

[56] References Cited

UNITED STATES PATENTS

| | | | |
|---|---|---|---|
| 2,326,042 | 8/1943 | Lessman | 350/117 UX |
| 3,372,971 | 3/1968 | Quackenbush et al. | 350/117 |
| 2,689,387 | 9/1954 | Carr | 350/117 UX |

FOREIGN PATENTS OR APPLICATIONS 592,815   9/1947   Great Britain.........................350/120

Primary Examiner—S. Clement Swisher
Assistant Examiner—Joseph W. Roskos
Attorney—William H. J. Kline, Robert F. Crocker and Lloyd F. Seebach

[57] ABSTRACT

A projection screen for eliminating scintillations caused by a projected image in which the screen comprises two spaced and generally parallel glass plates that are maintained as a unit by a layer of transparent material therebetween. The plates are provided on their facing surfaces with a layer of light-diffusing material and the surfaces are joined by a transparent, resilient material which will permit orbital movement of one plate relative to the other.

10 Claims, 3 Drawing Figures

PATENTED FEB 8 1972 3,640,602

ROBERT N. WOLFE
INVENTOR.

BY Lloyd F. Seebach

AGENT

PROJECTION SCREEN

FIELD OF THE INVENTION

The invention relates to a projection screen and more particularly to a transmission projection screen in which a transparent resilient material is arranged between two glass plates so that one plate can be moved relative to the other for eliminating scintillations.

DESCRIPTION OF THE PRIOR ART

In most every screen of the transmission type that is commercially available, scintillations due to light transmitted through the screen as a flash are evident and are particularly annoying in that the scintillations (flickering of light) cause eye fatigue and strain when the image on the screen is viewed for any appreciable period of time. Many attempts have been made to reduce or eliminate scintillations by moving the screen by means of an eccentric or a drive system whereby a definite and repetitive pattern of movement can be obtained. However, scintillations persist on the screen in certain specific areas because of the manner in which the screen movement is repeated. In addition to the moving screen attempts have been made to coat the screen on one or both surfaces with a light-diffusing material or to arrange a sheet of diffusing material in contact with one or both surfaces of the screen to eliminate scintillations, or to combine such a screen structure with movement of the screen. However, the combination of diffusing material and screen movement has not produced a screen that is considered to be good enough to gain wide acceptance in a field such as that in which reader-printers are used and in which an image and generally the same image is viewed by a person for an appreciable period of time.

SUMMARY OF THE INVENTION

The primary object of the invention is to provide a transmission projection screen in which scintillations are completely eliminated.

Another object of the invention is to provide a transmission projection screen which is easier to view and with less, if any, eye fatigue because of the elimination of scintillations.

Still another object of the invention is to provide a transmission projection screen of such structure that one portion of the screen can be moved relative to the other with a material therebetween which aids in the elimination of scintillations.

These and other objects of the invention will be apparent to those skilled in the art when read in conjunction with the attached drawing which also forms a part of the disclosure.

The objects of the invention are attained by a screen structure comprising two separated plates or sheets of transparent material. The facing surfaces of the plates are provided with a diffusing surface, or a layer of diffusing material, and the plates are joined or maintained as a unit by a transparent, resilient material. The resilient material permits one of the plates to be moved relative to the other and since it has an index of refraction that is different from that of the plates or the diffusing material, it also acts and serves as an additional diffusing material. The transmission of light through the different media of different indices of refraction, while at least one of the media is moved relative to the others, causes the light to be diffused to such an extent over the full area of the screen so that the scintillations are generally eliminated or at least reduced to such an extent that they are no longer of any consequence. Further, since the plates comprising the screen are joined by a resilient material, the movement of one relative to the other also aids in a further elimination of the scintillations.

DESCRIPTION OF THE DRAWINGS

Reference is now made to the accompanying drawing wherein like reference numerals designate like parts and wherein.

DESCRIPTION OF THE PREFERRED EMBODIMENT

Figure 1:
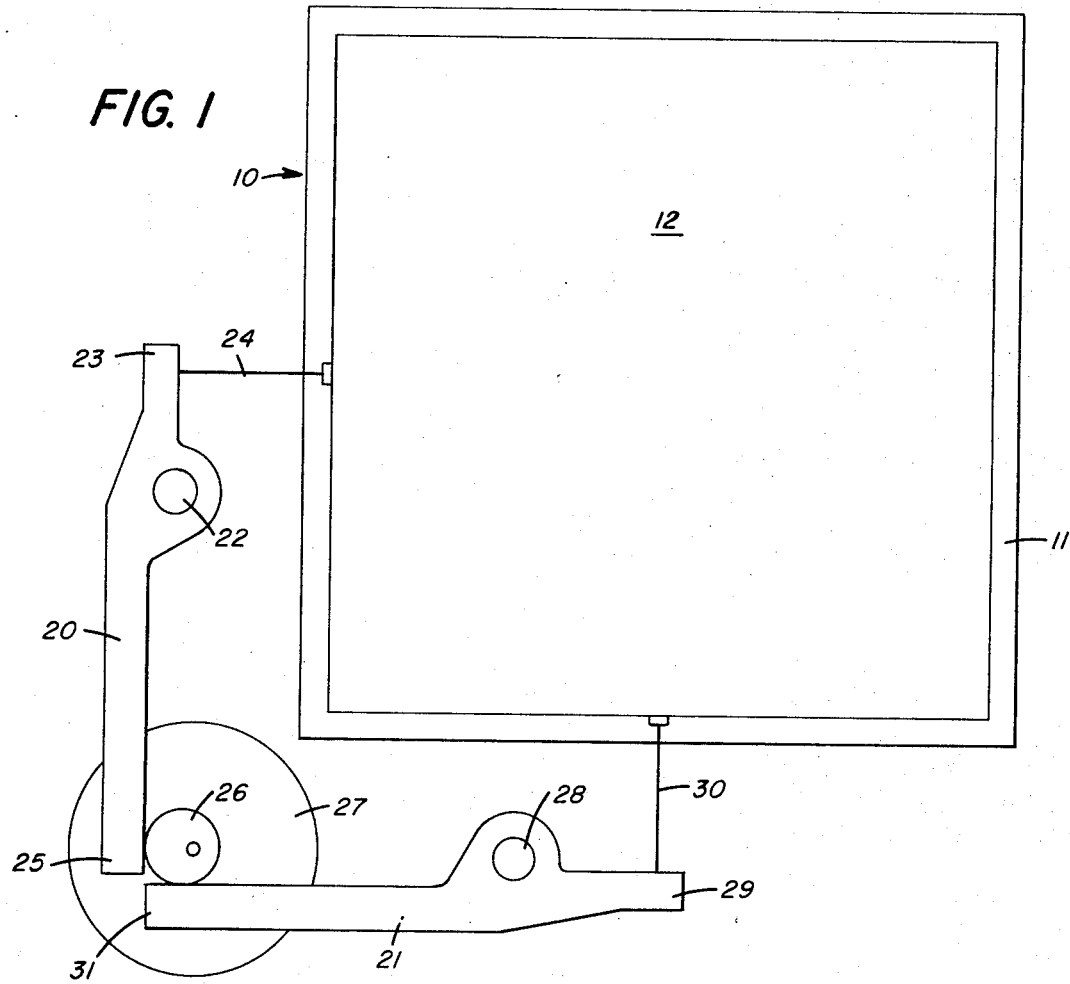
FIG. 1 is a front elevational view showing a screen in accordance with the invention and an arrangement by which one of the screen elements can be rotated relative to the other.
Figure 2:
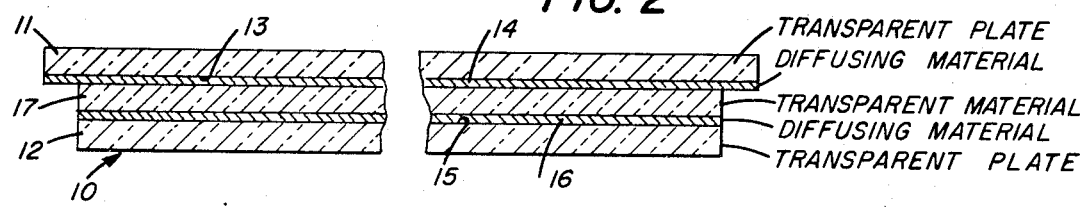
FIG. 2 is an enlarged cross-sectional view through the screen showing one embodiment of the screen structure.
Figure 3:
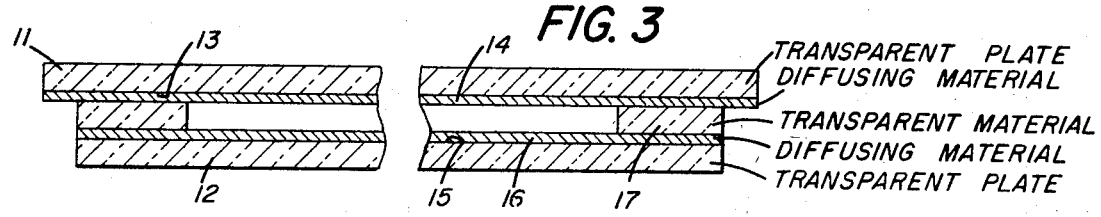
FIG. 3 is an enlarged sectional view through the screen showing another embodiment of the screen structure.

With reference particularly to FIGS. 2 and 3, a screen 10 comprises a plate 11 of transparent material and a second plate 12 of transparent material. The plates 11 and 12 can be of a glass or any transparent plastic material having the requesite optical qualities. Also, the plates 11 and 12 need not be of the same material; for example, one plate can be of glass and the other of plastic, nor do the plates 11 and 12 need to be of the same shape and size. The surface 13 of plate 11 is coated with a layer of diffusing material 14 which can be a gelatin having fine particles of chlorinated diphenyl resin incorporated therein. Likewise, facing surface 15 of plate 12 is also provided with a layer 16 of the same diffusing material. As shown in FIG. 1, the plates 11 and 12, with the diffusing material thereon are separated to the extent that a layer of transparent resilient material 17 can be placed between the diffusing layers and in contact therewith.

In FIG. 3 substantially the same structure is disclosed except that the transparent resilient material 17 is applied only between the marginal portions of the surfaces of the diffusing layers on plates 11 and 12.

The diffusing material is one that has an index of refraction that is different from that of the plates 11 and 12. A diffusing material that is acceptable and provides excellent results in a screen constructed in accordance with the invention is one known in the trade by the name Arochlor. This diffusing material is essentially that described in Canadian Pat. No. 417,973 in the names of Weyerts and Kern and comprises gelatine having fine particles of chlorinated diphenyl resin incorporated therein. In practice, plates 11 and 12 are washed, dried and then coated on one surface thereof with a layer of the Arochlor diffuser. After coating and drying, the plates are arranged relative to each other with the coated surfaces facing each other and spaced apart by about 0.010 inch. The plates 11 and 12 can be shimmed apart to about this dimension and held so that the transparent resilient material 17 can be poured between the plates.

The transparent, resilient material 17 is one that must have an index of refraction that is different from that of the diffusing material and of the plates 11 and 12. Such a material can be a silicone rubber having a continuous resiliency when cured and which does not dry out upon exposure. A material of this type is manufactured by Dow-Corning Company and sold under the name of Sylgard 51. With such a material it is merely poured between the two plates 11 and 12 and heated. Upon heating, the Sylgard 51 composition becomes a type of synthetic rubber with corresponding elastic properties. The refractive index of the material does not change substantially upon curing. Further, the material retains its rubber characteristics even with continuous flexing over a long period of time.

While the surfaces 13 and 15 have been described as being coated with a diffusing material, the same result can be obtained by forming a matte surface directly on the plates 11 and 12. Also, in place of coating a diffusing material on the surfaces of the plates 11 and 12, a sheet of diffusing material can be mounted on the plates or adhered thereto at least around the peripheral edges of the plates.

The transparent, resilient material 17 (Sylgard 51) is a dielectric gel and has unique properties in that when gelled in place, it forms a resilient, self-sealing protective cushion. When properly catalyzed and cured, this dielectric gel develops into a soft, transparent, jelly-like mass having excellent thermal and dielectric properties over a wide variation in temperature. It is initially a fluid, but upon gelation problems of leakage are eliminated as well as problems with respect to moisture and/or the effects of mechanical shock or vibration. While Sylgard 51 is a type of silicone rubber, other transparent, silicone rubber materials can be used, provided they might have essentially the same physical properties.

The screen described hereinabove is one which can be readily manufactured and provides a viewing medium that is completely free of scintillations. The transparent, resilient material 17 permits one of plates 11 and 12 to be moved relative to the other by a mechanism as shown in FIG. 1. While this mechanism is merely for the purpose of illustrating the manner in which the screen can be moved or vibrated, a more complete disclosure and description of such a mechanism is found in U.S. Ser. No. 813,936, filed Apr. 7, 1969 in the name of Ronald R. Firth.

With reference to FIG. 1, the screen 10 is mounted in such a way that plate 11 is maintained in a fixed position. By means of pivotally mounted links 20 and 21, the plate 12 can be moved relative to plate 11. The link 20 is pivotally mounted at 22 and has one end 23 that carries a wire 24 of relatively small diameter and which engages an edge of plate 12. The other end 25 engages an eccentric 26 which is driven by a suitable motor 27. Likewise, the link 21 is pivotally mounted at 28 and at its end 29 carries a wire 30 that engages an adjacent side of plate 12. The other end 31 of link 21 also engages the eccentric 26. The arrangement of links 20 and 21 relative to eccentric 26 is such that plate 12 moves in an orbital path. Preferably, such path is circular, although a path of other configuration can be used. Actually, the orbital pattern of the moving plate 12 can be any motion that moves all of the screen in two directions at about the same speed and distance so that scintillations in any part of the screen are eliminated. As previously mentioned, the preferred pattern is circular. The distance through which the path extends is not critical nor is the orbiting speed so long as the movable plate moves at a sufficient speed so that the resulting variation in the scintillation pattern is above the critical flicker frequency of the human eye, namely approximately 60 cycles/second.

The invention has been described in detail with particular reference to preferred embodiments thereof, but it will be understood that variations and modifications can be effected within the spirit and scope of the invention.

I claim:

1. A light transmission screen for displaying a projected light image, comprising:
   a first plate of transparent material having a diffusing surface;
   a second plate of transparent material having a diffusing surface arranged in close proximity and parallel to the diffusing surface of said first plate; and
   a transparent, resilient material between and contacting at least a portion of each of said diffusing surfaces for permitting orbital movement of one of said plates relative to the other, whereby scintillations produced by the transmission of said light image are generally eliminated.

2. The light transmission screen in accordance with claim 1 wherein at least one of said first and second plates of transparent material is glass and said plates have a matte surface for diffusing the transmitted light.

3. The light transmission screen in accordance with claim 1 wherein said first and second plates of transparent material are glass and at least one surface of each of said plates has a layer of light-diffusing material in contact therewith.

4. The light transmission screen in accordance with claim 3 wherein said layers of light-diffusing material have an index of refraction different from that of said plates of transparent material.

5. The light transmission screen in accordance with claim 1 wherein said first and second plates of transparent material are glass and at least one surface of each said plates is coated with a layer of light-diffusing material.

6. The light transmission screen in accordance with claim 5 wherein said light-diffusing material has an index of refraction different from that of said plates of transparent material.

7. The light transmission screen in accordance with claim 1 wherein said transparent, resilient material is a dielectric gel having an index of refraction that is different from that of said plates of transparent material and contacts said diffusing surfaces.

8. The light transmission screen in accordance with claim 1 wherein said transparent, resilient material is silicone potting material having an index of refraction that is different from that of said plates of transparent material.

9. The light transmission screen in accordance with claim 1 wherein said transparent, resilient material is a rubber adhesive having an index of refraction different from that of said plates of transparent material.

10. A light transmission screen for displaying a projected light image, comprising:
    a first plate of glass having a coating of light diffusing material on one surface thereof, the index of refraction of said material being different from that of said first plate of glass;
    a second plate of glass having a coating of light-diffusing material on one surface thereof, the index of refraction of said material being different from that of said second plate of glass;
    said plates of glass being arranged relative to each other with the coated surfaces thereof in facing, closely spaced and generally parallel relation; and
    a transparent, silicone rubber compound arranged between and adhesively contacting each of said coated surfaces for permitting orbital movement of one of said plates of glass relative to the other, whereby scintillations produced by transmission of said light image are generally eliminated.

* * * * *